Nov. 22, 1955  C. H. BRANNEN  2,724,421
PIPE LINING AND STRAIGHTENING MACHINE APPARATUS
Filed May 10, 1952  2 Sheets-Sheet 1

INVENTOR
CHARLES H. BRANNEN
BY
Mason & Graham
ATTORNEYS

Nov. 22, 1955
C. H. BRANNEN
2,724,421
PIPE LINING AND STRAIGHTENING MACHINE APPARATUS
Filed May 10, 1952
2 Sheets-Sheet 2
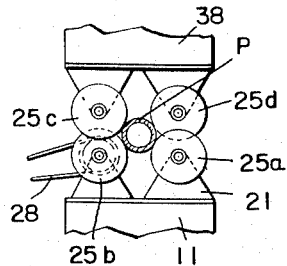
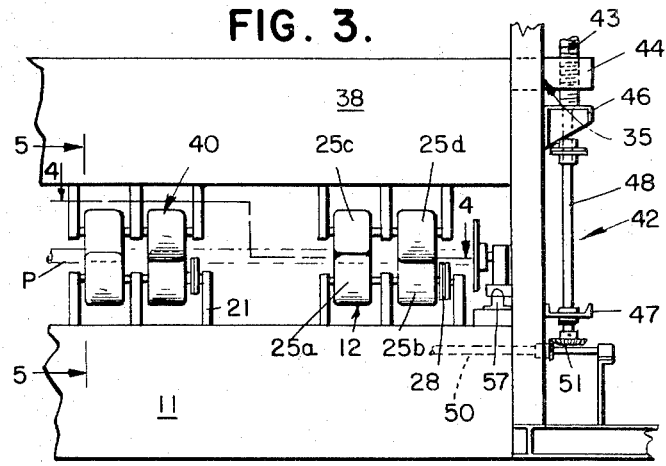
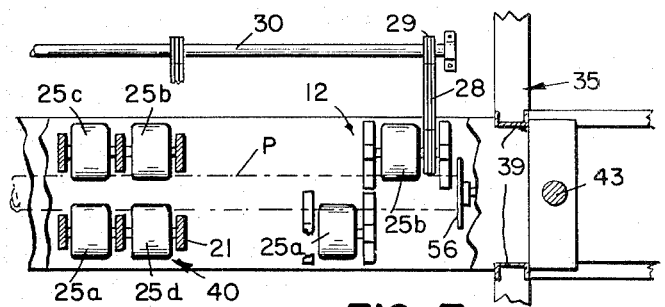
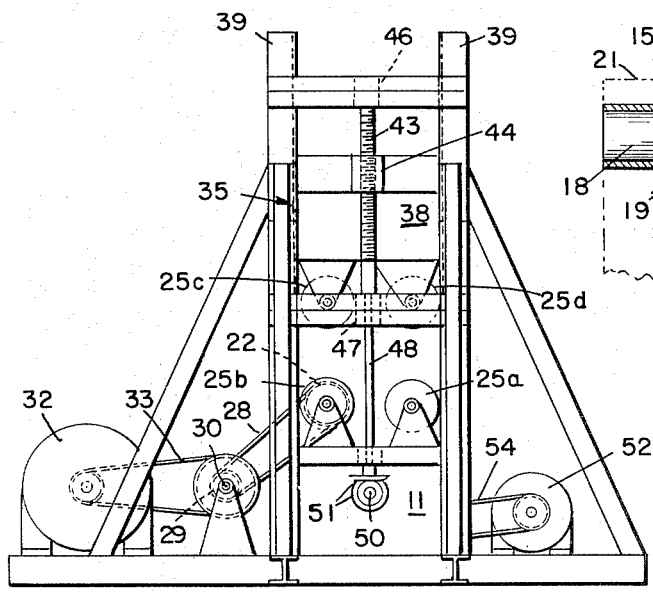
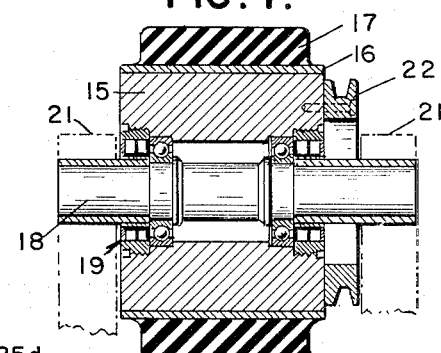
INVENTOR
CHARLES H. BRANNEN
BY
Musan & Graham
ATTORNEYS

United States Patent Office 2,724,421
Patented Nov. 22, 1955

2,724,421

PIPE LINING AND STRAIGHTENING MACHINE APPARATUS

Charles H. Brannen, Orangeburg, S. C., assignor to American Pipe and Construction Co., a corporation of Delaware Application May 10, 1952, Serial No. 287,191

3 Claims. (Cl. 153—54)

This invention has to do generally with the art of lining pipe by the centrifugal process and particularly with means for supporting and rotating the pipe or shell to be lined.

An object of my invention is to provide novel and improved apparatus for supporting and rotating a pipe or metal shell to be lined with cement, mortar, or other coating material. It is a particular object to provide such apparatus for efficiently handling pipe of small diameter, that is, pipe having a diameter of three or four inches, which is also capable of readily handling pipe of considerably greater diameter.

One problem in lining pipe of small diameter is that the pipe is seldom straight when delivered to the lining equipment. It can be appreciated that when the lining is applied by the centrifugal process, unless the pipe is substantially straight, the applied lining will vary in thickness and may even have holes or voids in places. Therefore, with ordinary lining equipment it is first necessary to straighten the pipe before lining it. One of the objects of my invention is to provide apparatus for supporting and rotating pipe for lining which also functions to straighten the pipe as it is being lined.

Another object is to provide apparatus of the type indicated, including sets of upper and lower rollers between which the pipe is held in which novel means are provided for mounting the upper rollers. More particularly in this connection, it is an object to provide means whereby the upper rollers can be quickly and easily raised or lowered as a unit.

These and other objects will be apparent from the drawings.

Referring to the drawings:

Fig. 3 is a fragmentary side elevational view on an enlarged scale of one end portion of the apparatus of Figs. 1 and 2;

Fig. 4 is a sectional plan view on line 4—4 of Fig. 3;

Fig. 5 is a sectional view on line 5—5 of Fig. 3;

Fig. 6 is an end elevational view of the apparatus; and

Fig. 7 is a sectional view through one of the lower rollers.

Figure 1:
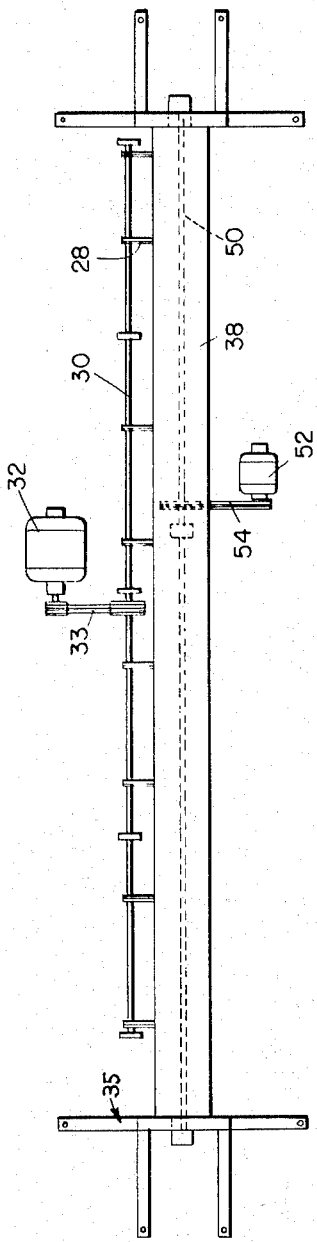
Fig. 1 is a plan view of apparatus embodying the invention.
Figure 2:
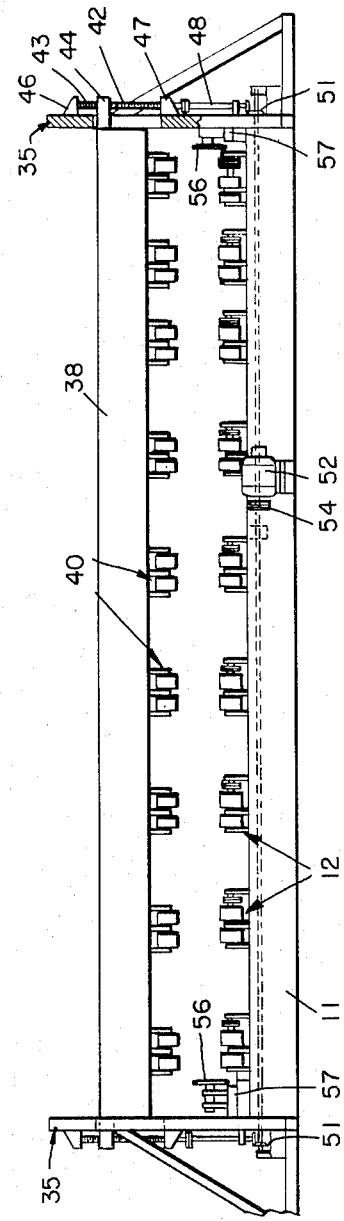
Fig. 2 is a side elevational view of the apparatus of Fig. 1.

More particularly describing the invention, numeral 11 generally indicates a foundation or base upon which are mounted a plurality of lower rollers which, for convenience, are disposed in sets of two each, the sets of rollers being indicated generally by numeral 12. Each of the rollers may comprise a wheel body 15 (Fig. 7) of metal having a peripheral rim 16 to which is bonded a rubber tire 17. The wheel rotates about an axle or shaft 18, bearings 19 being interposed between the two. Each shaft is supported by pillow blocks 21. As will later appear certain of the wheels are driven, and such wheels are provided with a sheave or pulley wheel 22 which is bolted or otherwise secured to the body 15.

The two rollers of each set of rollers 12 are laterally and axially offset as best shown in Fig. 4. For convenience the lower rollers have been indicated by numerals 25a and 25b. The rollers 25a of each of the sets of rollers 12 are in alignment axially and similarly all the rollers 25b are in alignment axially. Preferably each of the rollers 25b is provided with the aforementioned sheave 22 and is driven by a belt 28 passing around a pulley 29 on a driveshaft 30. The latter is driven by a motor 32 through the medium of a belt drive 33.

I provide an end frame 35 at each end of the base beyond the endmost lower rollers. A support or horizontal member 38 extends between the end frames, the member 38 being guided at its ends for vertical sliding movement between the laterally spaced vertical members 39 of the end frames. A plurality of sets 40 of upper rollers are mounted on member 38. These upper rollers are similar to the lower rollers previously described and, except for the fact that they are inverted, are mounted similarly to the lower rollers. The upper rollers have been designated 25c and 25d. All of the rollers 25c are on a common axis above the axis of rollers 25a and all the rollers 25d are on a common axis above the rollers 25b. None of the upper rollers are driven.

Each pair of rollers in the upper sets 40 are diagonally offset or in other words both axially and laterally offset in the same manner as the lower rollers but oppositely thereto. With this construction, the upper rollers may be lowered against the pipe P (Fig. 5) supported on the lower rollers and the upper rollers will come between the lower rollers and not interfere therewith.

The member 38 is actuated by jack screw means 42 located on the end frames. This means includes a screw 43 which is threadedly received in an extension 44 on the member 38. The screw is journaled in the members 46 and 47 on the end frame. Each screw 43 is coupled to a vertical shaft 48, and these are driven by a horizontal shaft 50 through the medium of gears 51. A motor 52 is provided for driving shaft 50 by means of belt drive means 54.

For the purpose of preventing axial migration of the pipe P during spinning thereof, I provide rotatable circular end plates 56 beyond the endmost rollers, and these are supported by members 57.

In the operation of the device, a pipe P is loaded with a measured quantity of lining material and then placed on the lower rollers with the member 38 in elevated position. The member 38 is then lowered to bring the upper rollers into contact with the pipe. The pipe can then be spun (after charging with lining material) by driving the rollers 25b.

I have found that, by using a plurality of rollers along the pipe and having these arranged so that they are axially and laterally offset in the manner described, a considerable straightening action is achieved on the pipe simultaneously with the placement of the lining material by centrifugal force.

Although I have shown and described a preferred form of my invention I do not intend to be limited to this since various changes and modifications can be made in the apparatus without departing from the invention, the scope of which is indicated by the claims.

I claim:

1. In apparatus for spinning pipe for the purpose of straightening and lining the same, an elongated base, two rows of axially spaced lower rollers mounted on said base arranged with their axes of rotation parallel to the longitudinal axis of said base to support a pipe to be spun, a pair of end frames on said base positioned, respectively, beyond the endmost lower rollers, a horizontally extending elongated support above said lower rollers mounted at its ends for guided vertical movement in said end frames, two rows of axially spaced rollers carried by said support with their axes of rotation parallel to the longitudinal axes of said support for engaging a pipe supported on said lower rollers, means for rotating certain of said rollers, and means for raising and lowering said support.

2. In apparatus for straightening and lining pipe, means for supporting and rotating the pipe comprising, a base structure, a plurality of lower sets of rollers mounted on said base structure, each set of rollers including two rollers spaced axially and laterally of each other, the rollers of one set being respectively in axial alignment with the corresponding rollers of the other sets, a support above said lower sets of rollers, a plurality of upper sets of rollers carried by said support above said lower sets, each set of rollers of said upper sets including two rollers spaced axially and laterally of each other oppositely to the rollers of the corresponding lower sets, the rollers of said upper sets being in axial alignment respectively on two laterally spaced axes, means for elevating and lowering said support, and means for rotating some of said rollers.

3. Apparatus as set forth in claim 2 in which each roller of said upper sets of rollers is in lateral alignment with a roller of the lower sets of rollers.

References Cited in the file of this patent

UNITED STATES PATENTS

| | | |
|---|---|---|
| 265,265 | Kellogg | Oct. 3, 1883 |
| 366,466 | Dwelle | July 12, 1887 |
| 395,400 | McCool | Jan. 1, 1889 |
| 606,214 | Hill | June 28, 1898 |
| 666,419 | Hass | Jan. 22, 1901 |
| 1,629,154 | Ybarrondo | May 17, 1927 |
| 2,263,022 | Urschell | Nov. 18, 1941 |
| 2,558,741 | Drygulski | July 3, 1951 |

FOREIGN PATENTS

| | | |
|---|---|---|
| 463,374 | Great Britain | Mar. 30, 1937 |